United States Patent [19]

Miller et al.

[11] 3,914,301

[45] Oct. 21, 1975

[54] ACRYLAMIDE DERIVATIVES OF 3-ISOTHIAZOLONES

[75] Inventors: George A. Miller, Glenside; Sheldon N. Lewis, Willow Grove; Ernest D. Weiler, Fort Washington, all of Pa.

[73] Assignee: Rohm and Haas Company, Philadelphia, Pa.

[22] Filed: May 6, 1971

[21] Appl. No.: 140,992

[52] U.S. Cl. ...... 260/561 S; 260/309.2; 260/302 A; 260/453 R; 260/454; 260/465 D; 260/465.4; 260/470; 260/481 R; 260/516; 260/558 S; 260/534 S; 260/562 T; 260/934; 424/208; 424/273; 424/298; 424/302; 424/304; 424/308; 424/311; 424/317; 424/324; 71/87; 71/92; 71/98; 71/104

[51] Int. Cl.² .............. C07C 103/60; C07C 154/00; C07C 154/02; C07C 155/00

[58] Field of Search ............. 260/309.2, 453 R, 454, 260/455 B, 934, 470, 481, 516, 534, 561, 562

[56] References Cited

UNITED STATES PATENTS

| | | | |
|---|---|---|---|
| 3,161,495 | 12/1964 | Miller | 260/309.2 |
| 3,442,941 | 5/1969 | Emerson et al. | 260/561 |
| 3,541,119 | 11/1970 | Richter et al. | 260/561 |

OTHER PUBLICATIONS

Crow et al., Aust. J. Chem., Vol. 22, 765–774, (69).
Crow et al., J. Org. Chem., Vol. 30, pp. 2660–2665, (65).

*Primary Examiner*—Harry I. Moatz
*Attorney, Agent, or Firm*—William E. Lambert, III E. Lambert, III

[57] ABSTRACT

When 3-isothiazolones are subjected to nucleophilic cleavage, a novel class of S-substituted β-thioacrylamides is produced. These acrylamides exhibit biological activity, particularly in controlling microorganisms.

8 Claims, No Drawings

ACRYLAMIDE DERIVATIVES OF 3-ISOTHIAZOLONES

This invention relates to novel acrylamides which are derived from 3-isothiazolones, to their preparation, to biocidal compositions containing them, and to their utilization in the control of living organisms.

The novel acrylamides of the invention can be represented by formulas I, II, III, and IV as follows:

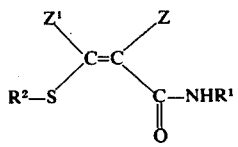 (I)

wherein
$R^1$ is hydrogen, an alkyl, alkenyl, or alkynyl group of 1 to 18 carbon atoms, preferably a $(C_1-C_{12})$alkyl group, which may be optionally substituted with one or more hydroxy groups, halogen atoms, $(C_1-C_4)$alkoxy groups, cyano groups, amino groups, $(C_1-C_4)$alkylamino groups, $(C_1-C_4)$dialkylamino groups, $(C_1-C_4)$alkylthio groups, carboxy groups, $(C_1-C_4)$carbalkoxy groups, or similar substituent groups, or an aryl or aralkyl group of up to 10 carbon atoms, which may be optionally substituted with one or more hydroxy groups, halogen atoms, $(C_1-C_4)$alkoxy groups, $(C_1-C_4)$alkyl groups, nitro groups, cyano groups, amino groups, $(C_1-C_4)$alkylamino groups, $(C_1-C_4)$dialkylamino groups, $(C_1-C_4)$alkylthio groups, carboxy groups, $(C_1-C_4)$carbalkoxy groups, or similar substituent groups;
$R^2$ is a group of the formula

wherein
R is a $(C_1-C_4)$alkyl group and
X is oxygen or sulfur,
a group of the formula $R^3$—Q—S—,
wherein
Q is a divalent $(C_1-C_4)$ alkylene radical and
$R^3$ is a group of the formula $RO_2C-$, $HO_2C-$, $H_2NOC-$, or $R_2NOC-$, wherein R is as defined above,
or a group of the formula

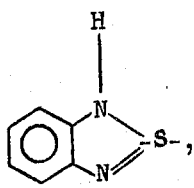

or a similar heterocyclic group,
Z is a hydrogen atom, a halogen atom, preferably chlorine or bromine, or a $(C_1-C_4)$alkyl group, and
$Z^1$ is a hydrogen atom, a halogen atom, preferably chlorine or bromine, or a $(C_1-C_4)$alkyl group;

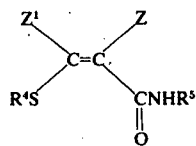 (II)

wherein
$R^5$ is an alkyl group of 4 to 18, and preferably 4 to 12, carbon atoms,
$R^4$ is a cyano group, an alkylthio group of 1 to 18, preferably 1 to 12, and most preferably 4 to 12 carbon atoms, an arylthio group of 6 to 12 carbon atoms, an aralkylthio group of 7 to 15, and preferably of 7 to 10, carbon atoms, and
Z and $Z^1$ are as defined above;

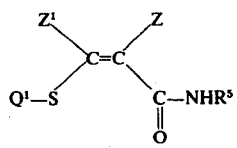 (III)

wherein
$Q^1$ is a methyl group substituted with a nitro group, or with two or three electron-withdrawing groups, such as, aryl groups, carbalkoxy groups, carbamoyl groups, carboxy groups, cyano groups, or similar electron-withdrawing groups, and
$R^5$, Z, and $Z^1$ are as defined above;

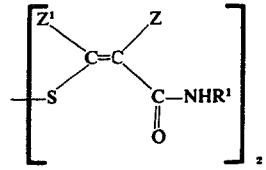 (IV)

wherein $R^1$, Z, and $Z^1$ are as defined above.

The alkyl portions of any of the substituents R, $R^1$, $R^2$, $R^3$, $R^4$, $R^5$, Z, and $Z^1$ can have straight- or branched-chain or cyclic spatial configurations. Representative alkyl groups include methyl, ethyl, propyl, butyl, amyl, hexyl, octyl, nonyl, decyl, dodecyl, hexadecyl, and octadecyl, in both straight- and branched- chain configurations, as well as cyclopentyl, cyclohexyl, cycloheptyl, methylcyclohexyl, and the like.

Representative compounds of the invention which have Formula I include:
cis-3-diethylthiophosphoryldithioacrylamide,
cis-3-dipropylthiophosphoryldithiomethacrylamide,
cis-3-acetyldithioacrylamide,
cis-3-propionyldithioethacrylamide,
cis-3-acetyldithio-3-methylacrylamide,
cis-3-carboxymethylenedithioacrylamide,
cis-3-carboxyethylenedithioacrylamide,
cis-3-carbethoxyethylenedithio-2-chloroacrylamide,
cis-N-ethyl-3-carbamoylpropylenedithiomethacrylamide,
cis-3-diethyldithiocarbamatethioacrylamide,
cis-3-dibutyldithiocarbamatethiomethacrylamide,
cis-N-n-octyl-3-diethyldithiocarbamoylthioacrylamide,
cis-N-n-dodecyl-3-dimethyldithiocarbamoylthiomethacrylamide, and
cis-N-n-octyl-3-(2-benzimidazole)dithioacrylamide.

Representative compounds of the invention which have Formula II include:
- cis-N-n-butyl-3-t-butyldithioacrylamide,
- cis-N-n-butyl-3-n-butyldithiomethacrylamide,
- cis-N-n-octyl-3-ethyldithioacrylamide,
- cis-N-n-hexyl-3-n-decyldithiomethacrylamide,
- cis-N-n-octyl-3-t-butyldithioacrylamide,
- cis-N-n-decyl-3-t-butyldithioacrylamide,
- cis-N-n-nonyl-3-methyldithio-2-bromoacrylamide,
- cis-N-n-octyl-3-n-octyldithioacrylamide,
- cis-N-isobutyl-3-cyclohexyldithioethacrylamide,
- cis-N-t-octyl-3-t-butyldithioacrylamide,
- cis-N-n-hexyl-3-t-butyldithioacrylamide,
- cis-N-phenyl-3-n-octyldithioacrylamide,
- cis-N-4-chlorophenyl-3-methyldithiomethacrylamide,
- cis-N-benzyl-3-methyldithiomethacrylamide,
- cis-N-t-butyl-3-(4-chlorobenzyl)dithioacrylamide,
- cis-N-n-octyl-3-n-butyldithioacrylamide,
- Cis-N-n-butyl-3-ethyldithiomethacrylamide,
- cis-N-n-octyl-3-t-butyldithio-2-bromoacrylamide,
- cis-N-n-octyl-3-methyldithio-3-methylmethacrylamide,
- cis-N-isodecyl-3-propyldithio-3-ethylacrylamide,
- cis-N-n-butyl-3-cyanothiomethacrylamide, and
- cis-N-hexyl-3-cyanothioacrylamide.

Representative compounds of the invention which have Formula III include:
- cis-N-n-octyl-3-nitromethyldithioacrylamide,
- cis-N-t-butyl-3-nitromethyldithiomethacrylamide,
- cis-N-dodecyl-3-nitromethyldithio-2-bromoacrylamide,
- 2-cyano-2-(N-n-octyl-cis-3-acrylamide)mercaptoacetate, and
- diethyl 2-(N-n-hexyl-cis-3-methacrylamide)mercaptomalonate Representative compounds of the invention which have Formula IV include:
- cis, cis-3,3'-dithioacrylamide,
- cis, cis-3,3'-dithio-2,2'-dibromoacrylamide,
- cis, cis-N,N'-di-n-butyl-3,3'-dithiomethacrylamide,
- cis, cis-N,N'-diethyl-3,3'-dithioacrylamide,
- cis, cis-N,N'-di-n-decyl-3,3'-dithiomethacrylamide,
- cis, cis-N,N'-di-n-hexyl-3,3'-dimethyl-3,3'-dithioacryl-amide,
- cis, cis-N,N'-di-t-octyl-3,3'-dithioacrylamide, and
- cis, cis-3,3'-dithiomethacrylamide.

All of the novel acrylamides of the invention can be prepared by reacting a 3-isothiazolone with a suitable nucleophilic reagent. This reaction can be schematically represented as follows:

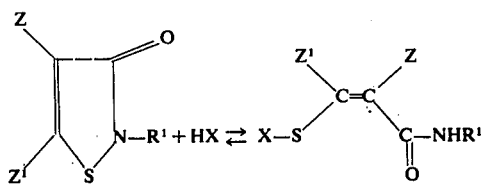

in which HX represents a typical nucleophilic reagent and $R^1$, Z, and $Z^1$ are as defined above. Among the nucleophilic agents which can be used to cleave the isothiazole ring are hydrogen cyanide, mercaptobenzene, substituted mercaptobenzenes, substituted and unsubstituted alkyl and aralkyl mercaptans, such as butyl mercaptan, hexyl mercaptan, octyl mercaptan, benzyl mercaptan, allyl mercaptan and the like, O,O-dialkyl hydrogen dithiophosphates, such as O,O-diethyl hydrogen dithiophosphate, thioacetic acid, and related higher alkyl thioacids, mercaptoacids, such as mercaptoacetic acid, 3-mercaptopropionic acid, and the like, N,N-dialkyl dithiocarbamates, such as N,N-diethyl dithiocarbamate, O-alkyl dithiocarbonates, S-alkyl trithiocarbonates, nitromethane, benzimidazoles and similar nucleophilic heterocyclic compounds, and the like. Another class of useful nucleophilic reagents are those compounds which can form relatively stable carbanions. One group of these compounds can be represented by the formula $$Q^2CH_2Q^3 \qquad (V)$$

wherein
$Q^2$ and $Q^3$ are nitro groups, aryl groups, carbalkoxy groups, carbamoyl groups, cyano groups, carboxy groups, or similar electron-withdrawing groups. Examples of compounds of formula V, which when reacted with 3-isothiazolones form compounds of formula III, include cyanoacetic acid, ethyl cyanoacetate, and other alkyl esters of cyanoacetic acid, malonic acid, diethyl malonate and other alkyl esters of malonic acid, malonamide, triphenylmethane, malonitrile, and the like. Nitromethane also falls within this general class of compounds which can form relatively stable carbanions. It should be noted that this nucleophilic ring cleavage generally produces the cis - acrylamide derivatives.

In preparing the compounds of the invention, equimolar amounts of the 3-isothiazolone and the nucleophilic reagent are generally used. However, it may be advantageous under some reaction conditions to use an excess of the nucleophilic reagent. An inorganic base, such as sodium hydroxide, can be advantageously used under some reaction conditions. The reaction between the nucleophilic reagent and the 3-isothiazolone is generally carried out at a temperature of about 0° to about 100° C., and preferably about 20° to about 40° C. Various solvents can be used in carrying out the reaction, if desired, including water and organic solvents such as methanol, ethanol, acetone, methyl ethyl ketone, diethyl ether, and the like. Any solvent or mixture of solvents which will not interfere with the reaction can be used. Specific examples showing methods for preparing the compounds of the invention are set forth in the examples below.

Various methods of preparation of the 3-isothiazolones from which the acrylamides are made are described in U.S Pat. Applications Ser. No. 836,660 of S. N. Lewis, G. A. Miller, and A. B. Law, filed on June 25, 1969 and Ser. No. 855,046, of S. N. Lewis, G. A. Miller, and A. B. Law, filed on Sept. 3, 1969. Any of the 3-isothiazolones or 3-hydroxyisothiazolones described in these two patent applications can be reacted with appropriate nucleophilic reagents to form acrylamides of the invention.

The following examples will further illustrate the preparation and use of acrylamides of the invention, but are not intended to limit the invention in any way. In the examples, all temperatures are given in degrees Centigrade and all parts are by weight, unless otherwise indicated. Examples 1 to 29 are presented in tabular form in Table I. Specific preparations of the compounds of Examples 1, 3, 4, 5, 6, 7, 12, 17, 24, 25, 26, 28, and 29 are set out below to illustrate the various methods of preparing the acrylamides of the invention.

EXAMPLE 1

Preparation of cis-3-Phenyldithioacrylamide

To a solution of 20.0 g (0.2 mol) of 3-isothiazolone in 200 ml of water was added dropwise 22 g (0.2 mole) of benzenethiol. A yellow precipitate formed immediately and the mixture was allowed to stir for 1 hour at room temperature. Filtration afforded 37 g (87%) of crude product. Recrystallization of the crude product from a cold chloroform-hexane solvent mixture gave analytically pure material, m.p. 119°–20° C.

EXAMPLE 3

Preparation of cis-N-n-Butyl-3-t-butyldithioacrylamide

To a solution of 4.3 g (0.027 mol) of 2-n-butyl-3-isothiazolone in 50 ml of water was slowly added a solution consisting of 2.25 g (0.025 mol) of t-butyl mercaptan and 10 ml 2.5 N (0.025 mol) of sodium hydroxide. The solution became cloudy and then acidified by addition of 25 ml 1 N hydrochloric acid. A white precipitate was obtained and filtration gave 5.6 g (90%) of product, m.p. 111°–114° C (ether-hexane).

EXAMPLE 4

Preparation of cis-3-Diethylthiophosphoryldithioacrylamide

To a solution of 10.0 g (0.1 mol) of 3-isothiazolone in 100 ml of water was slowly added 18.6 g (0.1 mol) diethyl dithiophosphate. A white precipitate formed immediately. The reaction was stirred for two hours at room temperature and filtration afforded 21.5 g (75%) of white solid, m.p. 94°–95° C.

EXAMPLE 5

Preparation of cis-3-Acetyldithioacrylamide

To a solution of 5.0 g (0.05 mol) of 3-isothiazolone in 50 ml of water was slowly added a solution of 5 g (0.066 mol) of thioacetic acid in 2 ml of acetone. A white precipitate formed immediately and filtration of the reaction mixture yielded 8.1 g (91%) of product, m.p. 138°–140° C.

EXAMPLE 6

Preparation of cis-3-Carboxymethylenedithioacrylamide

To a solution of 5.0 g (0.05 mol) of 3-isothiazolone in 50 ml of water was slowly added a solution of 5 g (0.088 mol) of soldium thioglycolate in 50 ml 1 N hydrochloric acid. A tan precipitate crystallized immediately. The reaction mixture was filtered, washed with water and dried to give 7.6 g (78%) of product, m.p. 164°–165° C.

EXAMPLE 7

Preparation of cis-3-Diethyldithiocarbamate-thioacrylamide

To a solution of 10.0 g (0.1 mol) of 3-isothiazolone in 100 ml of water was slowly added 22.5 g (0.1 mol) of sodium diethyldithiocarbamate in 60 ml of water. A white precipitate formed shortly after the addition was complete. The solution was slowly acidified by the addition of 100 ml 1 N hydrochloric acid. The reaction mixture was filtered, washed with small amounts of water and dried to yield 18 g (72%) of product, m.p. 78°–80° C.

EXAMPLE 12

Preparation of cis-N-n-Decyl-3-t-butyldithioacrylamide

To a solution of 7.2 g (0.03 mol) of 2-n-decyl-3-isothiazolone in 100 ml of water and 40 ml of acetone was slowly added a solution consisting of 2.8 g (0.03 mol) of t-butyl mercaptan and 2.8 g (0.035 mol) of 50% aqueous soldium hydroxide in 20 ml of water. An oil precipitated immediately. The mixture was acidified (pH 3-3 N HCl) and twice extracted with 150 ml of ethyl acetate. The ethyl acetate solution was dried over magnesium sulfate and concentrated to 20-30 ml in volume. Addition of 100 ml pentane caused the precipitation of a white solid. Filtration afforded 7.9 g (80%) of product, m.p. 57°–60° C.

EXAMPLE 17

Preparation of cis-N-n-Octyl-3-[2-benzimidazole]-dithioacrylamide

To a solution of 7.8 g (0.0368 mol) of 2-n-octyl-3-isothiazolone in 100 ml of water and 40 ml of acetone was added a solution consisting of 4.5 g (0.03 mol) of 2-mercaptobenzimidazole, 3.5 g (0.0438 mol) of 50% aqueous sodium hydroxide and 20 ml of water. A small amount of gummy precipitate formed immediately. The mixture was acidified (3 N HC 1) after 20 minutes of stirring at room temperature and a white solid precipiated. Filtration yielded a white solid which was recrystallized from ethyl acetate to give 7.0 g (68%) of the product, m.p. 190° C.

EXAMPLE 24

Preparation of cis, cis-3,3'-Dithiodiacrylamide

To a solution of 5.0 g (0.05 mol) of 3-isothiazolone in 50 ml of water was slowly added a solution consisting of 4.0 g (0.065 mol) of ethanethiol and 20 ml 2.5 N (0.05 mol) sodium hydroxide. The reaction mixture became cloudy and was allowed to stir 15 minutes at room temperature. The mixture was acidified by the addition of 50 ml 1 N hydrochloric acid. A white precipitate separated immediately. The reaction mixture was filtered, washed with water and dried to give 3.1 g (62%) of product, m.p. 153°–154° C (acetone-hexane).

EXAMPLE 25

Preparation of cis, cis-3,3'-Dithio-2,2'-dibromodiacrylamide

To a solution of 7.2 g (0.04 mol) of 4-bromo-3-isothiazolone and 3.4 g (0.0425 mol) of 50% aqueous sodium hydroxide in 40 ml of water was slowly added 7.1 g (0.04 mol) of 3,4-dichlorobenzylthiol. A white precipitate formed immediately. Filtration yielded 6.8 g bis-3,4-dichlorobenzyl disulfide. The filtrate was acidified (pH 2, 3 N HCl) and a white solid separated. The reaction mixture was filtered, thoroughly washed with acetone and ether, and then dried to give 5.6 g (78%) of product, m.p. 172°–173° C.

EXAMPLE 26

Preparation of cis, cis-N,N'-Diethyl-3,3'-dithiodiacrylamide

To a solution of 6.45 g (0.05 mol) of 2-ethyl-3-isothiazolone in 50 ml of water was slowly added a solution consisting of 3.1 g (0.05 mol) of ethyl mercaptan and 4.0 g (0.05 mol) of 50% aqueous soldium hydroxide in 10 ml of water. A small amount of oil separated immediately. The mixture was stirred for 15 minutes and then acidified (pH 4, conc. HCl) to give a slightly gummy white precipitate. The mixture was filtered and the solid was thoroughly washed with ether to give 3.65 g (56%) of white product, m.p. 168°–170° C.

EXAMPLE 28

Preparation of cis-N-n-Octyl-3-nitromethyldithioacrylamide

A solution of sodium ethoxide was prepared by dissolving 1.2 g (0.05 g-atom) of sodium in 300 ml of absolute ethanol. The solution was cooled to 5° and 3.05 g (0.05 mol) of nitromethane was added rapidly. To the resulting solution was added 10.7 g (0.05 mol) of 2-n-octyl-3-isothiazolone in 25 ml of ethanol. The mixture was allowed to stand several days. The mixture was then acidified with 2 N hydrochloric acid and filtered to remove a trace of yellow solid. The filtrate was diluted with water to twice its volume, saturated with sodium chloride and extraced with ether. The ether solution was dried over magnesium sulfate and evaporated to a red, oily mixture. This mixture was taken up in fresh ether and the solution was cooled in dry-ice to −20°. Dilution with hexane gave an emulsion from which a waxy solid soon separated. Filtration yielded 8.75 g (63.9%) of product.

EXAMPLE 29

Preparation of 2-Cyano-2-N-n-octyl-cis-3-acrylamido)-mercaptoacetate

To a solution of sodium ethoxide prepared by dissolving 1.2 g (0.05 g-atom) of sodium in 300 ml of absolute ethanol, was added at 5°, 5.6 g (0.05 mol) of ethyl cyanoacetate. To this solution was added 10.7 g (0.05 mol) of 2-n-octyl-3-isothiazolone in 25 ml of ethanol. The mixture was allowed to stand overnight. The clear solution was acidified with 2 N hydrochloric acid, diluted with an equal volume of water and extracted with ether. The ether extract was dried over magnesium sulfate and evaporated under reduced pressure to a viscous oil. On standing the oil solidified. The solid was crystallized from benzene-hexane giving 9.5 g (58%) of product as white granular solid, m.p. 66.5°–70° C.

TABLE I

ACRYLAMIDES

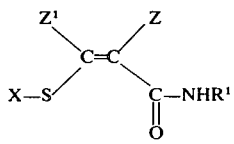

| Ex. No. | m.p./b.p. °C | X | Z | Z¹ | R¹ | C | | H | Analysis (Calculated) N | | S | |
|---|---|---|---|---|---|---|---|---|---|---|---|---|
| 1 | 119–120 | C₆H₅S— | H | H | H | 50.96 | (51.1) | 4.50 | (4.3) | 6.46 | (6.6) | 30.25 | (30.4) |
| 2 | 142–144 | t—C₄H₉S— | H | H | H | 43.96 | (43.9) | 6.71 | (6.9) | 7.26 | (7.3) | 33.62 | (33.9) |
| 3 | 111–114 | t—C₄H₉S— | H | H | n—C₄H₉ | 55.31 | (53.3) | 8.40 | (8.5) | 5.38 | (5.6) | 24.80 | (25.9) |
| 4 | 94–95 | (C₂H₅O)₂P(S)S— | H | H | H | 29.20 | (29.3) | 5.08 | (4.9) | 4.16 | (4.88) | 33.18 | (33.5) |
| 5 | 138–140 | CH₃C(O)S— | H | H | H | 33.88 | (33.9) | 3.92 | (4.0) | 7.65 | (7.9) | 36.60 | (36.2) |
| 6 | 164–165 | HOOCCH₂S— | H | H | H | 31.48 | (31.1) | 3.74 | (3.6) | 7.22 | (7.2) | 32.85 | (33.1) |
| 7 | 78–80 | (C₂H₅)₂NC(S)S— | H | H | H | 37.64 | (38.4) | 5.85 | (5.6) | 10.78 | (11.2) | 35.38 | (38.4) |
| 8 | 146–149 | HOOCCH₂CH₂S— | H | H | H | 34.89 | (34.8) | 4.25 | (4.4) | 6.55 | (6.7) | 30.80 | (30.9) |
| 9 | 54–55 | C₂H₅S— | H | H | n—C₈H₁₇ | 56.62 | (56.9) | 9.18 | (9.1) | 5.20 | (5.1) | 23.68 | (23.1) |
| 10 | 49–51 | t—C₄H₉S— | H | H | n—C₈H₁₇ | 59.56 | (59.5) | 9.45 | (9.6) | 4.60 | (4.6) | 20.88 | (21.1) |
| 11 | 84–85 | (C₂H₅)₂NC(S)S— | H | H | n—C₈H₁₇ | 53.10 | (52.8) | 8.36 | (8.3) | 7.72 | (7.7) | 26.51 | (26.5) |
| 12 | 57–60 | t—C₄H₉S— | H | H | n—C₁₀H₂₁ | 61.25 | (61.5) | 10.25 | (10.0) | 4.19 | (4.2) | 19.35 | (19.4) |
| 13 | oil | n—C₈H₁₇S— | H | H | n—C₈H₁₇ | 63.16 | (63.4) | 10.64 | (10.4) | 3.94 | (3.9) | 17.88 | (17.8) |
| 14 | oil | n—C₈H₁₇S— | H | H | n—C₁₀H₂₁ | 63.82 | (65.2) | 10.40 | (10.6) | 3.32 | (3.6) | 15.52 | (16.6) |
| 15 | 144–145 | p—ClC₆H₄S— | H | H | H | 44.00 | (44.0) | 3.25 | (3.3) | 5.67 | (5.7) | 26.35 | (26.2) |
| 16 | oil | t—C₈H₁₇S— | H | H | n—C₈H₁₇ | 62.88 | (63.4) | 10.29 | (10.4) | 4.03 | (3.9) | 17.37 | (17.8) |
| 17 | 190–192 | benzothiazol-2-yl-S— | H | H | n—C₈H₁₇ | 59.96 | (59.5) | 7.41 | (6.9) | 10.07 | (11.6) | 16.28 | (17.7) |
| 18 | 104–106 | t—C₄H₉S— | H | H | t—C₈H₁₇ | 59.47 | (59.5) | 9.54 | (9.6) | 4.61 | (4.6) | 21.56 | (21.1) |
| 19 | 111–112 | C₆H₅CH₂S— | H | H | H | 53.03 | (53.3) | 4.76 | (4.9) | 6.22 | (6.2) | 28.41 | (28.4) |
| 20 | 94–97 | t—C₄H₉S— | H | H | n—C₆H₁₃ | 56.70 | (56.9) | 9.20 | (9.1) | 5.06 | (5.1) | 23.45 | (23.30) |
| 21 | oil | n—C₄H₉S— | H | H | n—C₈H₁₇ | 59.84 | (59.5) | 9.18 | (9.6) | 4.87 | (4.6) | 19.93 | (21.1) |
| 22 | 65–66 | C₂H₅S— | H | H | n—C₄H₉ | 49.12 | (49.3) | 7.81 | (8.0) | 6.38 | (6.36) | 29.23 | (29.4) |
| 23 | oil | t—C₄H₉S— | Br | H | n—C₈H₁₇ | 47.15 | (47.1) | 7.50 | (7.4) | 3.81 | (3.7) | 17.00 | (16.80)* |
| 27 | 149–151 | NC— | H | H | H | 37.78 | (37.5) | 3.87 | (3.1) | 21.70 | (21.9) | | |
| 28 | wax | NO₂CH₂— | H | H | n—C₈H₁₇ | 53.59 | (52.6) | 8.35 | (8.0) | 7.3 | (10.2) | 12.49 | (11.7) |
| 29 | 66–70 | CN\\_C₂H₅O₂C/CH— | H | H | n—C₈H₁₇ | 59.01 | (58.9) | 8.03 | (8.0) | 8.41 | (8.6) | 9.92 | (9.8) |

$$[SCZ^1\!=\!CZ\overset{O}{\underset{\|}{C}}\!-\!NHR_1]_2$$

| 24 | 153–154 | | H | H | H | 35.50 | (35.3) | 3.70 | (3.9) | 13.50 | (13.7) | 30.57 | (31.3) |
| 25 | 173–175 | | Br | H | H | 20.09 | (19.8) | 1.72 | (1.7) | 7.40 | (7.7) | 17.57 | (17.7) |
| 26 | 176–177 | | H | H | C₂H₅ | 45.98 | (46.1) | 6.28 | (6.2) | 10.38 | (10.7) | 24.93 | (24.6) |

*Example 23 Br is 21.10 (20.9)

The novel acrylamides of the invention are biocidally active compounds, and, are useful for the control of various living organisms. For example, they are useful as bactericidal, fungicidal, and algaecidal agents.

In addition to the novel acrylamides of the invention, it was also found that several known acrylamides derived from 3-isothiazolones also are biocidally active. These compounds are described in the literature but their biocidal activity was unknown prior to the present invention. These compounds include:

cis-3-thiocyanoacrylamide,
cis-N-methyl-3-thiocyanoacrylamide,
cis-N-ethyl-3-thiocyanoacrylamide,
N-ethyl-cis-3-(nitromethyl)mercaptoacrylamide,
2-cyano-2-(N-ethyl-cis-3-acrylamido)mercaptoacetate,
diethyl 2-(N-ethyl-cis-3-acrylamido)mercaptomalonate,
cis-3-phenyldithioacrylamide, and
cis-3-t-butyldithioacrylamide.

Antibacterial and antifungal activity were evaluated by the Serial Dilution Test (Broth Titer Test) wherein a series of broths containing varying dilutions of a test compound and an organism are halved starting with 1:1,000. Table II summarizes the microbiocidal activity of some of the acrylamides of the invention. The other acrylamides of formulas I, II, III, and IV are also biocidally active. The values shown in Table II represent the maximum dilution in parts per million at which the compound under evaluation renders complete control of the organism. *Pseudomonas aeruginosa* (Pseudo.), *Staphylococcus aureus* (Staph.), and *Escherichia coli* (*E. coli*) were the bacterial organisms employed in this test, and the fungi employed were *Aspergillus niger* (*A..niger*) and *Rhizopus stolonifer* (*Rhizo.*). The acrylamides of the invention were also evaluated as algaecides by the Fitzgerald Test (Applied Microbiology, 7, 205–211, No. 4, 1959), against *Chlorella pyrenoidosa* (*Chlorella*) and "Black" algae (*Oscilatoria sp.*).

mer dispersions, water-based paints, and the like. In addition, these compounds and/or compositions containing them can function as fabric and leather preservatives, cosmetic preservatives, soap additives, sanitizing agents, such as in laundry soaps and detergents, preservatives for metal working compounds, such as emulsifiable cutting oils, preservatives for fuels, fiber spin finish biocides, and the like.

In general, a locus subject to attack by microorganisms can be protected in accordance with this invention by incorporating into the locus an acrylamide of the invention in an amount which is effective to control the microorganisms. The term "contamination" is meant to include any attack by microorganisms which leads to a chemical or physical breakdown or disintegration of the locus as well as the proliferation of the microorganisms within the locus without an accompanying deleterious effect. The exact amount of acrylamide required will, of course, vary with the medium being protected, the microorganisms being controlled, the particular acrylamides or compositions containing the acrylamides being employed, and the like. Typically, in a liquid medium, excellent control is obtained when the acrylamides are incorporated in the range of 0.1 to 10,000 parts per million (ppm.) or 0.00001 to 1% based on the weight of the medium. A range of 1 to 2000 ppm. is preferred.

The term "control", as employed in the specification and claims of this application, is to be construed as the

TABLE II

| | MICROBIOCIDAL ACTIVITY Minimum Microbistatic Concentration (ppm) | | | | | | |
|---|---|---|---|---|---|---|---|
| Example No. | Algae | | Fungi | | | Bacteria | |
| | Chlorella | "Black" | A. niger | Rhizo. | Pseudo | Staph. | E. coli |
| 1 | 5 | 5 | 16, 63 | 63, 63 | 125 | 125 | 125 |
| 2 | 2–5 | 1–5 | 125, 63 | 63, 63 | 125 | 500 | 250 |
| 3 | 5–10 | 2–5 | 63 | 16 | 500 | >500 | >500 |
| 4 | 5 | >10 | 125 | 63 | 125 | 125 | 250 |
| 5 | 10 or < | >10 | >500 | >500 | >500 | 1000 | 1000 |
| 6 | 1.25 | 10 | >500 | >500 | >500 | 1000 | 1000 |
| 7 | 20 | 20 | 250 | 125 | — | 125 | 125 |
| 8 | 0.6–10 | 0.6–10 | 125 | 125 | — | 250 | 125 |
| 9 | >10 | >10 | 125 | 125 | 1000 | 1000 | 1000 |
| 10 | >20 | 10 | 125 | 250 | >500 | 500 | >500 |
| 11 | 10 | 5 | 16 | 4 | >500 | 500 or < | >500 |
| 12 | >20 | >20 | 500 | 500 | >500 | >500 | >500 |
| 13 | >20 | >20 | 63 | 250 | >500 | 500 or < | >500 |
| 14 | >20 | >20 | 500 or< | >500 | >500 | >500 | >500 |
| 16 | >20 | >20 | 500 | 500 | >500 | >500 | >500 |
| 17 | >20 | >20 | ~500 | >500 | >500 | >500 | >500 |
| 18 | >20 | >20 | >500 | >500 | >500 | >500 | >500 |
| 19 | 10 | 20 | >500 | >500 | >500 | >500 | >500 |
| 20 | 20 | 20 | 125 | 250 | >500 | 500 or < | >500 |
| 21 | >20 | ~20 | 16 | 125 | >500 | 500 or < | >500 |
| 23 | >20 | 1.25 | 500 or < | 500 | 500 | 500 or < | 500 |
| 24 | 2.5 | 10 | 125 | 63 | 62 | 125 | 62 |
| 25 | 10 | 10 | ~500 | ~500 | 125 | 125 | 250 |
| 27 | 1 | 10 | 125 | | 31 | 125 | 63 |
| 28 | 10 | 10 | 31 | 63 | >500 | 500 or < | >500 |
| 29 | 5 | 5 | 31 | 8 | 500 | 16 | 500 |

Generally, control of a living organism is achieved in accordance with this invention by contacting the organism with an acrylamide in an amount which is effective to control the organism. Any of the techniques known in the art can be employed to disseminate the acrylamide in a manner so as to achieve the desired contact with the organism to be controlled. Spraying and fumigating are typical of such techniques.

The compounds of this invention can be utilized as slimicides, algaecides, bactericides, fungicides or combinations thereof in any locus and particularly in aqueous media, such as, for example, water-cooling systems, swimming pools, paper pulp processes, aqueous polyeffect of any means which adversely affects the existence or growth of any living organism or microorganism. This effect may comprise a complete killing action, eradication, arresting in growth, inhibition, reduction in number, or any combination of these effects.

The compounds of the invention are also useful as agricultural fungicides. As such, they are particularly valuable when formulated in a fungicidal composition. Such compositions normally comprise an agronomically acceptable carrier and the compounds disclosed herein as the active agent or agents. Where necessary or desirable, surfactants or other additives may be incorporated to give uniformly formulated mixtures. By "agronomically acceptable carrier" is meant any substance which can be utilized to dissolve, dispense or diffuse the chemical incorporated therein without impairing the effectiveness of the toxic agent and which does no permanent damage to such environment as soil, equipment, and agronomic crops.

For use as pesticides, the compounds of this invention are usually taken up in an agronomically acceptable carrier or formulated so as to render them suitable for subsequent dissemination. For example, the acrylamides may be formulated as wettable powders, emulsion concentrates, dusts granular formulations, aerosols or flowable emulsifiable concentrates. In such formulations, the acrylamides are extended with a liquid or solid carrier and, when desired, suitable surfactants are likewise incorporated.

Compounds of this invention can be dissolved in a water-miscible liquid such as ethanol, isopropanol, acetone, and the like. Such solutions are easily extended with water.

The acrylamides of the invention can be taken up on or mixed with a finely particled solid carriers, such as, for example, clays, inorganic silicates, carbonates, or silicas. Organic carriers can also be employed. Dust concentrates are commonly made wherein the acrylamides are present in the range of 20 to 80%. For ultimate applications these concentrates are normally extended with additional solid from about 1 to 20%.

Wettable powder formulations are made by incorporating the compounds of this invention in an inert, finely divided solid carrier along with a surfactant which may be one or more emulsifying, wetting, dispersing or spreading agents or blend of these. The acrylamides are usually present in the range of 10 to 80% by weight and the surfactants in from 0.5 to 10% by weight. Commonly used emulsifying and wetting agents include polyoxyethylated derivatives of alkylphenols, fatty alcohols, fatty acids and alkylamines; alkylarene sulfonates, and dialkyl sulfosuccinates. Spreading agents include such materials as glycerol mannitan laurate and condensates of polyglycerol and oleic acid modified with phthalic anhydride. Dispersing agents include such materials as the sodium salt of the copolymer of maleic anhydride and an olefin such as diisobutylene, sodium lignin sulfonate and sodium formaldehydenaphthalene sulfonates.

One convenient method for preparing a solid formulation is to impregnate the acrylamide onto the solid carrier by means of a volatile solvent, such as acetone. In this manner, adjuvants, such as activators, adhesives, plant nutrients, synergists and various surfactants, may also be incorporated.

Emulsifiable concentrate formulations can be prepared by dissolving the acrylamides of the invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvents. Mixtures of solvents are commonly employed. The surfactants useful as emulsifying agents generally constitute about 0.5 to 10% by weight of the emulsifiable concentrate and can be anionic, cationic or nonionic in character. Anionic surfactants include alcohol sulfates or sulfonates, alkylarene sulfonates and sulfosuccinates. Cationic surfactants include fatty acids alkyl amine salts and fatty acid alkyl quaternaries. Non-ionic emulsifying agents include ethylene oxide adducts of alkyl phenols, fatty alcohols, mercaptans and fatty acids. The concentration of the active ingredients generally varies from about 10 to 80%, preferably in the range of about 25 to 50%.

For use as bactericides and fungicides, dilute sprays can be applied at concentrations of generally about 0.05 to 20 pounds of the active acrylamide ingredient per 100 gallons of spray. They are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated or lowvolume sprays the materials are applied as mists.

The compounds of this invention can be utilized as the sole biocidal agents or they can be employed in conjunction with other fungicides, bactericides, algaecides, slimicides, mildewcides, insecticides, nematocides, and other comparable pesticides.

It is to be understood that changes and variations may be made without departing from the spirit and scope of the invention as defined by the appended claims.

We claim:

1. A compound of the formula (a), (b), or (c):

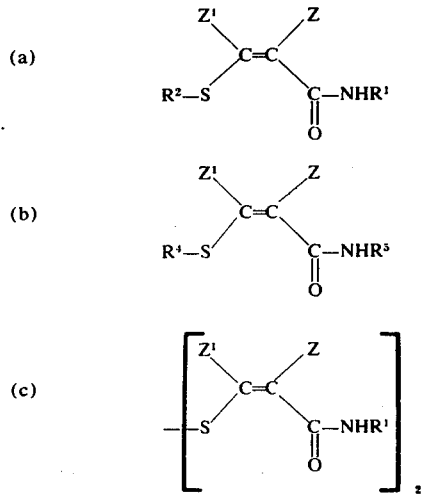

wherein $R^1$ is a hydrogen atom; an alkyl group of 1 to 18 carbon atoms; an alkyl group substituted with a hydroxy group, halogen atom, $(C_1-C_4)$alkoxy group, cyano group, amino group, $(C_1-C_4)$alkylamino group, $(C_1-C_4)$dialkylamino group, $(C_1-C_4)$alkylthio group, carboxy group, or $(C_1-C_4)$carbalkoxy group and having 1 to 18 carbon atoms; an alkenyl or alkynyl group having 2 to 18 carbon atoms; an aryl or aralkyl group of up to 10 carbon atoms; or an aryl or aralkyl group substituted with a hydroxy group, halogen atom, $(C_1-C_4)$alkoxy group, $(C_1-C_4)$alkyl group, nitro group, cyano group, amino group, $(C_1-C_4)$alkylamino group, $(C_1-C_4)$dialkylamino group, or $(C_1-C_4)$alkylthio group, carboxy group, or $(C_1-C_4)$-carbalkoxy group;

$R^2$ is a group of the formula

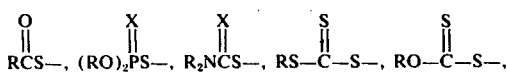

wherein
R is a $(C_1-C_4)$alkyl group and
X is oxygen or sulfur,
a group of the formula $R^3$-Q-S,
wherein
Q is a divalent $(C_1-C_4)$ alkylene radical and
$R^3$ is a group of the formula $RO_2C-$,
$HO_2-C-$, $H_2NOC-$, or $R_2NOC-$, wherein R is as defined above,
or a group of the formula

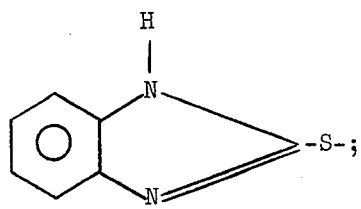

Z is a hydrogen atom, a halogen atom, or a $(C_1-C_4)$alkyl group,
$Z^1$ is a hydrogen atom, a halogen atom, or a $(C_1-C_4)$alkyl group;
$R^5$ is an alkyl group of 4 to 18 carbon atoms; and
$R^4$ is an alkylthio group of 1 to 18 carbon atoms, an arylthio group of 6 to 12 carbon atoms, or an aralkylthio group of 7 to 15 carbon atoms.

2. A compound according to claim 1 wherein the compound has the formula

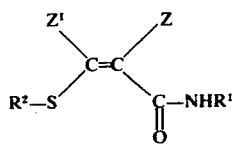

3. A compound according to claim 1 wherein the compound has the formula

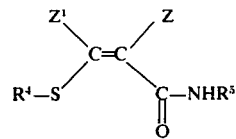

4. A compound according to claim 1 wherein the compound has the formula

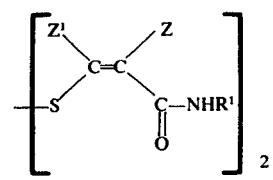

5. A compound according to claim 2 wherein $R^1$ is a hydrogen atom or a $(C_1-C_{12})$alkyl group.

6. A compound according to claim 3 wherein $R^5$ is a $(C_4-C_{12})$alkyl group.

7. A compound according to claim 6 wherein $R^4$ is an unsubstituted $(C_1-C_{12})$alkyl this group.

8. A compound according to claim 7 wherein $R^4$ is a t-butyl this or a n-butyl this group.

* * * * *

UNITED STATES PATENT OFFICE
CERTIFICATE OF CORRECTION

Patent No. 3,914,301            Dated October 21, 1975

Inventor(s) George A. Miller, Sheldon N. Lewis, Ernest D. Weiler.

It is certified that error appears in the above-identified patent and that said Letters Patent are hereby corrected as shown below:

In claim 7, "$(C_1-C_{12})$alkyl this" should be --$(C_1-C_{12})$alkylthio--.

In claim 8, "t-butyl this" should be --t-butylthio--.

In claim 8, "n-butyl this" should be --n-butylthio--.

Signed and Sealed this seventeenth Day of February 1976

[SEAL]

Attest:

RUTH C. MASON
*Attesting Officer*

C. MARSHALL DANN
*Commissioner of Patents and Trademarks*